United States Patent
Kawamura et al.

(10) Patent No.: US 11,594,764 B2
(45) Date of Patent: Feb. 28, 2023

(54) ALL SOLID BATTERY AND MANUFACTURING METHOD OF THE SAME

(71) Applicant: TAIYO YUDEN CO., LTD., Tokyo (JP)

(72) Inventors: Chie Kawamura, Tokyo (JP); Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 230 days.

(21) Appl. No.: 16/952,998

(22) Filed: Nov. 19, 2020

(65) Prior Publication Data

US 2021/0203004 A1    Jul. 1, 2021

(30) Foreign Application Priority Data

Dec. 27, 2019   (JP) ............... JP2019-239143

(51) Int. Cl.
*H01M 10/0585* (2010.01)
*H01M 10/0525* (2010.01)
*H01M 10/0562* (2010.01)
*H01M 4/64* (2006.01)

(52) U.S. Cl.
CPC ......... *H01M 10/0585* (2013.01); *H01M 4/64* (2013.01); *H01M 10/0525* (2013.01); *H01M 10/0562* (2013.01); H01M 2300/0071 (2013.01)

(58) Field of Classification Search
CPC ............. H01M 10/0585; H01M 10/64; H01M 10/0525; H01M 10/0562; H01M 2300/0071
See application file for complete search history.

(56) References Cited

U.S. PATENT DOCUMENTS

| | | | |
|---|---|---|---|
| 2013/0216912 A1* | 8/2013 | Suh | H01M 4/386 |
| | | | 429/218.1 |
| 2016/0036091 A1* | 2/2016 | Ohtomo | H01M 10/0562 |
| | | | 429/304 |
| 2017/0092987 A1* | 3/2017 | Haga | H01M 10/0585 |
| 2018/0287214 A1* | 10/2018 | Yamada | H01M 10/0587 |
| 2020/0313161 A1* | 10/2020 | Isojima | H01M 10/0525 |
| 2021/0159486 A1* | 5/2021 | Chung | H01M 10/0525 |

FOREIGN PATENT DOCUMENTS

| | | |
|---|---|---|
| JP | 2017-157362 A | 9/2017 |
| JP | 2018-125268 A | 8/2018 |

* cited by examiner

*Primary Examiner* — Matthew J Merkling
(74) *Attorney, Agent, or Firm* — Stein IP, LLC (57) ABSTRACT

An all solid battery includes a solid electrolyte layer, a first electrode structure that has a structure in which a first electric collector layer of which a main component is a conductive material is sandwiched by two first electrode layers including an active material, and a second electrode structure that has a structure in which a second electric collector layer of which a main component is a conductive material is sandwiched by two second electrode layers including an active material. Roughness of interfaces between the first electric collector layer and the two first electrode layers and/or roughness of interfaces between the second electric collector layer and the two second electrode layers is larger than roughness of interfaces between the solid electrolyte layer, and the first electrode layer and the second electrode layer sandwiching the solid electrolyte layer.

5 Claims, 6 Drawing Sheets

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2019-239143, filed on Dec. 27, 2019, the entire contents of which are incorporated herein by reference.

FIELD

A certain aspect of the present invention relates to an all solid battery and a manufacturing method of the all solid battery.

BACKGROUND

All solid batteries having an oxide-based solid electrolyte are expected as safe secondary batteries which do not cause combustion or hazardous gas which is peculiar to organic-based electrolyte or sulfide-based solid electrolyte. From a viewpoint of securing battery capacity, it is favorable that a solid electrolyte layer is thin. However, when the solid electrolyte layer is thin, short may occur or cycle characteristic may be degraded. It is therefore difficult to secure reliability.

And so, there is disclosed a technology in which the solid electrolyte layer is flattened by reducing a standard deviation of thicknesses of the solid electrolyte layer, and all solid batteries having solid electrolyte layers having a thickness of 10 μm or more achieves favorable cell characteristic (cycle characteristic) (for example, see Japanese Patent Application Publication No. 2017-157362).

SUMMARY OF THE INVENTION

In order to secure cell capacity, thickness reduction of the solid electrolyte layer is requested. However, when the thickness of the solid electrolyte layer is small, sufficient reliability may not be necessarily secured.

A multilayer type all solid battery has a structure in which a first electrode layer, an electric collector layer, a second electrode layer and a solid electrolyte layer are stacked in this order. In order flatten the solid electrolyte layer, it is thought that other layers are flattened. However, a metal material or a carbon material may be used as a conductive material which is a main component of the electric collector layer. A ceramic material may be used as a main component of the electrode layers. Therefore, peeling may easily occur at interfaces of layers, because of a material difference. Thus, a yielding rate may be degraded. Therefore, even if each layer is flattened, it is difficult to secure the reliability and suppress the peeling.

According to an aspect of the present invention, there is provided an all solid battery including: a solid electrolyte layer of which a main component is oxide-based solid electrolyte; a first electrode structure that is provided on a first main face of the solid electrolyte layer and has a structure in which a first electric collector layer of which a main component is a conductive material is sandwiched by two first electrode layers including an active material; and a second electrode structure that is provided on a second main face of the solid electrolyte layer and has a structure in which a second electric collector layer of which a main component is a conductive material is sandwiched by two second electrode layers including an active material, wherein roughness of interfaces between the first electric collector layer and the two first electrode layers is larger than roughness of interfaces between the solid electrolyte layer, and the first electrode layer and the second electrode layer sandwiching the solid electrolyte layer, roughness of interfaces between the second electric collector layer and the two second electrode layers is larger than the roughness of the interfaces between the solid electrolyte layer, and the first electrode layer and the second electrode layer sandwiching the solid electrolyte layer, or both of the roughness of the interfaces between the first electric collector layer and the two first electrode layers and the roughness of the interfaces between the second electric collector layer and the two second electrode layers are larger than the roughness of the interfaces between the solid electrolyte layer, and the first electrode layer and the second electrode layer sandwiching the solid electrolyte layer.

According to another aspect of the present invention, there is provided a manufacturing method of an all solid battery including: preparing a multilayer structure having a solid electrolyte green sheet including oxide-based solid electrolyte particles, a first structure that is provided on a first main face of the solid electrolyte green sheet and has a structure in which a first electric collector paste pattern including a conductive material is sandwiched by two first electrode paste patterns including an active material, and a second structure that is provided on a second main face of the solid electrolyte green sheet and has a structure in which a second electric collector paste pattern including a conductive material is sandwiched by two second electrode paste patterns including an active material; and firing the multilayer structure, wherein a particle diameter of the first electric collector paste pattern, a particle diameter of the second electric collector paste pattern, or both of the particle diameter of the first electric collector paste pattern and the particle diameter of the second electric collector paste pattern are adjusted, so that roughness of interfaces between a first electric collector layer formed from the first electric collector paste pattern and two first electrode layers formed from the two first electrode paste patterns is larger than roughness of interfaces between a solid electrolyte layer formed from the solid electrolyte green sheet, and the first electrode layer and the second electrode layer sandwiching the solid electrolyte layer, roughness of interfaces between a second electric collector layer formed from the second electric collector paste pattern and two second electrode layers formed from the two second electrode paste patterns is larger than the roughness of the interfaces between the solid electrolyte layer, and the first electrode layer and the second electrode layer sandwiching the solid electrolyte layer, or both of the roughness of the interfaces between the first electric collector layer and the two first electrode layers and the roughness of the interfaces between the second electric collector layer and the two second electrode layers is larger than roughness of interfaces between the solid electrolyte layer, and the first electrode layer and the second electrode layer sandwiching the solid electrolyte layer.

DETAILED DESCRIPTION

A description will be given of an embodiment with reference to the accompanying drawings.

Figure 1:
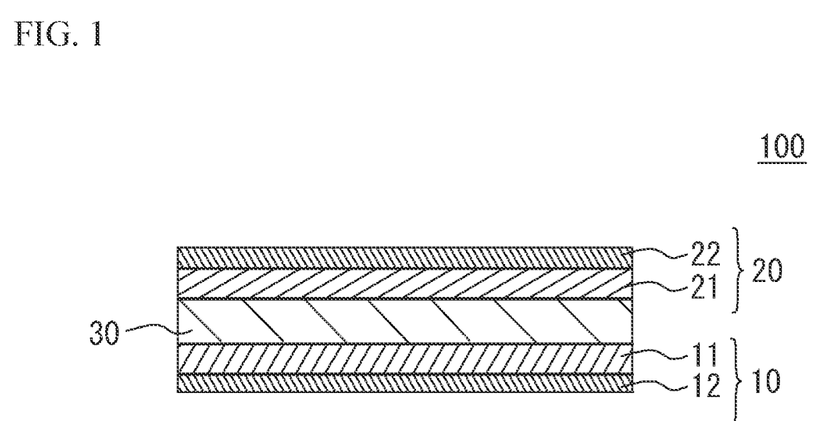
FIG. 1 illustrates a schematic cross section of a basic structure of an all solid battery.

(Embodiment) FIG. 1 illustrates a schematic cross section of a basic structure of an all solid battery 100 in accordance with an embodiment. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The first internal electrode 10 has a structure in which a first internal electrode layer 11 and a first electric collector layer 12 are stacked. The first internal electrode layer 11 is on the solid electrolyte layer 30 side. The second internal electrode 20 is provided on a second main face of the solid electrolyte layer 30. The second internal electrode 20 has a structure in which a second internal electrode layer 21 and a second electric collector layer 22 are stacked. The second internal electrode layer 21 is on the solid electrolyte layer 30 side.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is oxide-based solid electrolyte. For example, the oxide-based solid electrolyte is phosphoric acid salt-based solid electrolyte having a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1-x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first internal electrode layer 11 and the second internal electrode layer 21 is added in advance, is used. For example, when the first internal electrode layer 11 and the second internal electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first internal electrode layer 11 and the second internal electrode layer 21 include phosphoric acid salt including Li and a transition metal other than Co, it is preferable that the solid electrolyte layer 30 includes Li—Al—Ge—$PO_4$-based material in which the transition metal is added in advance.

At least, the first internal electrode layer 11 used as a positive electrode includes a material having an olivine type crystal structure, as an electrode active material. It is preferable that the second internal electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first internal electrode layer 11 acting as a positive electrode. For example, when only the first internal electrode layer 11 includes the electrode active material having the olivine type crystal structure, the electrode active material acts as the positive electrode active material. When the second internal electrode layer 21 also includes an electrode active material having the olivine type crystal structure, discharge capacity may increase and an operation voltage may increase because of electric discharge, in the second internal electrode layer 21 acting as a negative electrode. The function mechanism is not completely clear. However, the mechanism may be caused by partial solid-phase formation together with the negative electrode active material.

When both the first internal electrode layer 11 and the second internal electrode layer 21 include an electrode active material having the olivine type crystal structure, the electrode active material of each of the first internal electrode layer 11 and the second internal electrode layer 21 may have a common transition metal. Alternatively, the a transition metal of the electrode active material of the first internal electrode layer 11 may be different from that of the second internal electrode layer 21. The first internal electrode layer 11 and the second internal electrode layer 21 may have only single type of transition metal. The first internal electrode layer 11 and the second internal electrode layer 21 may have two or more types of transition metal. It is preferable that the first internal electrode layer 11 and the second internal electrode layer 21 have a common transition metal. It is more preferable that the electrode active materials of the both electrode layers have the same chemical composition. When the first internal electrode layer 11 and the second internal electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second internal electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode layer 11 and the second internal electrode layer 21, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

A main component of the first electric collector layer 12 and the second electric collector layer 22 is conductive material. For example, a metal material, a carbon material or the like can be used as the conductive material of the first electric collector layer 12 and the second electric collector layer 22.

Figure 2:
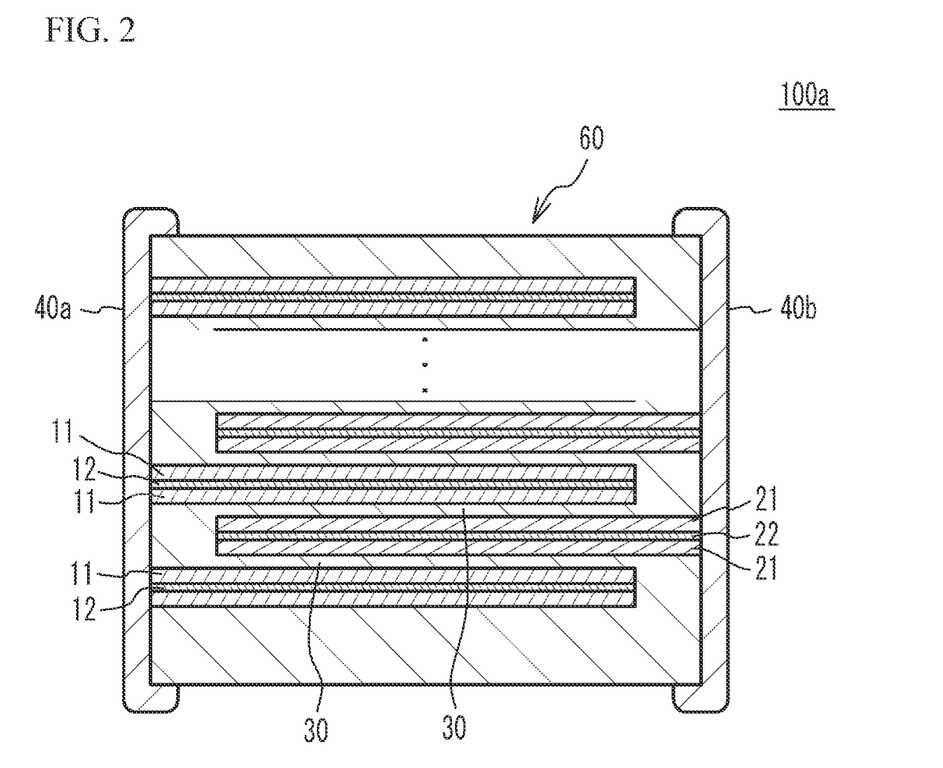
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape. The all solid battery 100a has a first external electrode 40a formed on a first end face of the multilayer chip 60 and a second external electrode 40b formed on a second end face facing with the first end face.

In four faces other than the two end faces of the multilayer chip 60, two faces other than an upper face and a lower face of the multilayer chip 60 in a stacking direction are referred to as side faces. The first external electrodes 40a and the second external electrode 40b extend to the upper face, the lower face and the two side faces of the multilayer chip 60. However, the first external electrode 40a and the second external electrode 40b are spaced from each other.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first internal electrode layer 11 is stacked on the first electric collector layer 12. The solid electrolyte layer 30 is stacked on the first internal electrode layer 11. The solid electrolyte layer 30 extends from the first external electrode 40a to the second external electrode 40b. The second internal electrode layer 21 is stacked on the solid electrolyte layer 30. The second electric collector layer 22 is stacked on the second internal electrode layer 21. Another second internal electrode layer 21 is stacked on the second electric collector layer 22. Another solid electrolyte layer 30 is stacked on the second internal electrode layer 21. The solid electrolyte layer 30 extends from the first external electrode 40a to the second external electrode 40b. The first internal electrode layer 11 is stacked on the solid electrolyte layer 30.

In the all solid battery 100a, the stack units are repeatedly stacked. Therefore, the all solid battery 100a has a structure in which a plurality of cell units are stacked.

From a viewpoint of securing cell capacity, it is preferable that the thickness of the solid electrolyte layers 30 is small. For example, the thickness of the solid electrolyte layers 30 is 10 μm or less. It is preferable that the thickness is 8 μm or less. It is more preferable that the thickness is 7 μm or less. It is still more preferable that the thickness is 6 μm or less. However, when the thickness of the solid electrolyte layers 30 is small, short may occur or cycle characteristic may be degraded. It is therefore difficult to secure reliability.

And so, it is thought that the solid electrolyte layers 30 is flattened. From a viewpoint of flattening the solid electrolyte layers 30, it is thought that other layers are flattened. However, peeling may easily occur at interfaces of layers, because of a difference between a main component material of the first electric collector layers 12 and the second electric collector layers 22 and a main component material of the first internal electrode layer 11 and the second internal electrode layer 21. Thus, a yielding rate may be degraded. Therefore, even if each layer is flattened, it is difficult to secure the reliability and suppress the peeling.

And so, the all solid batteries 100 and 100a have a structure to secure the reliability and suppress the peeling.

Figure 3:
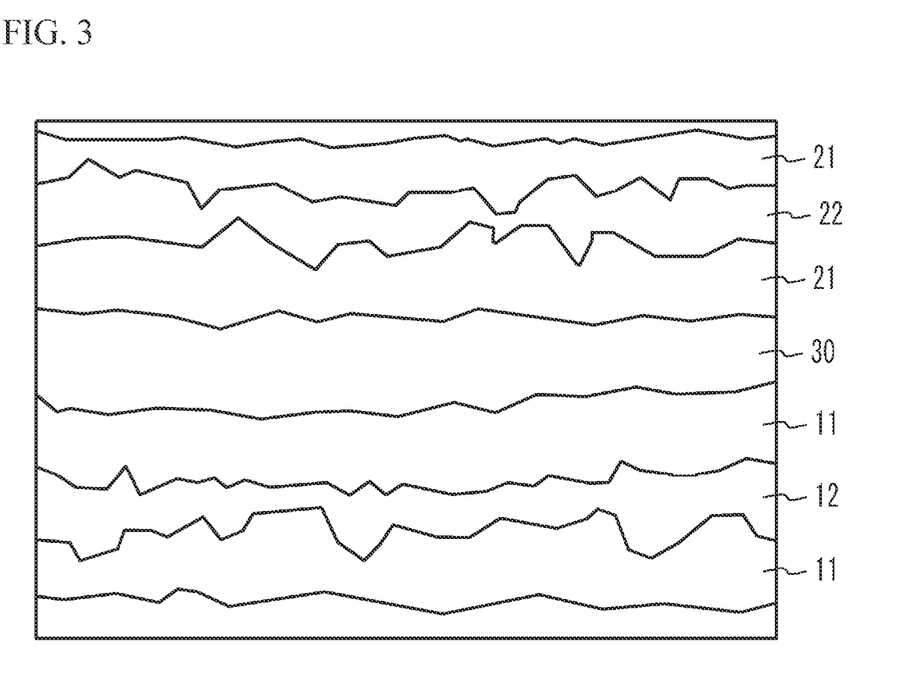
FIG. 3 illustrates a partially enlarged view of FIG. 2.

FIG. 3 is a partially enlarged view of FIG. 2. In FIG. 3, hatching is omitted. As illustrated in FIG. 3, the first internal electrode layer 11 is stacked under the first main face of the solid electrolyte layer 30. The first electric collector layer 12 is stacked under the first internal electrode layer 11. Another first internal electrode layer 11 is stacked under the first electric collector layer 12. That is, the first electric collector layer 12 is sandwiched by the two first internal electrode layers 11. The combination of the first electric collector layer 12 and the two first internal electrode layers 11 is referred to as a first electrode structure. The second internal electrode layer 21 is stacked on the second main face of the solid electrolyte layer 30. The second electric collector layer 22 is stacked on the second internal electrode layer 21. Another second internal electrode layer 21 is stacked on the second electric collector layer 22. That is, the second electric collector layer 22 is sandwiched by the two second internal electrode layers 21. The combination of the second electric collector layer 22 and the two second internal electrode layers 21 is referred to as a second electrode structure.

In the embodiment, a roughness of interfaces between the first electric collector layer 12 and the two first internal electrode layers 11 sandwiching the first electric collector layer 12 is larger than a roughness of interfaces between the solid electrolyte layer 30, and the first internal electrode layer 11 and the second internal electrode layer 21 sandwiching the solid electrolyte layer 30. And, a roughness of interfaces between the second electric collector layer 22 and the two second internal electrode layers 21 sandwiching the second electric collector layer 22 is larger than a roughness of interfaces between the solid electrolyte layer 30, and the first internal electrode layer 11 and the second internal electrode layer 21 sandwiching the solid electrolyte layer 30.

In the structure, the roughness of the interfaces between the solid electrolyte layer 30, and the first internal electrode layer 11 and the second internal electrode layer 21 sandwiching the solid electrolyte layer 30 is small. Therefore, the solid electrolyte layer 30 is flattened. It is therefore possible to suppress piercing of the solid electrolyte layer 30 by the electrode layers and short of the electrode layers. And, the cycle characteristic and self-discharge characteristic become favorable. That is, the reliability is improved. Main components of the first internal electrode layer 11, the second internal electrode layer 21 and the solid electrolyte layer 30 are ceramic. Therefore, adhesion between the first internal electrode layer 11 and the solid electrolyte layer 30 and adhesion between the second internal electrode layer 21 and the solid electrolyte layer 30 are favorable.

Next, the roughness of the interfaces between the first electric collector layer 12, and the two first internal electrode layers 11 sandwiching the first electric collector layer 12 is large. In this case, anchor effect is obtained. Thus, adhesion between the first electric collector layer 12 and the two first internal electrode layers 11 sandwiching the first electric collector layer 12 is improved. And the peeling is suppressed. The roughness of the interfaces between the second electric collector layer 22, and the two second internal electrode layers 21 sandwiching the second electric collector layer 22 is large. In this case, anchor effect is obtained. Thus, adhesion between the second electric collector layer 22 and the two second internal electrode layers 21 sandwiching the second electric collector layer 22 is improved. And the peeling is suppressed. When the roughness is large and the first internal electrode layer 11 penetrates the first electric collector layer 12, the two first internal electrode layers 11 are connected. When the roughness is large and the second internal electrode layer 21 penetrates the second electric collector layer 22, the two second internal electrode layers 21 are connected. Therefore, occurrence of the short may be suppressed.

Therefore, the all solid batteries 100 and 100a can secure the reliability and suppress the peeling.

Figure 4:
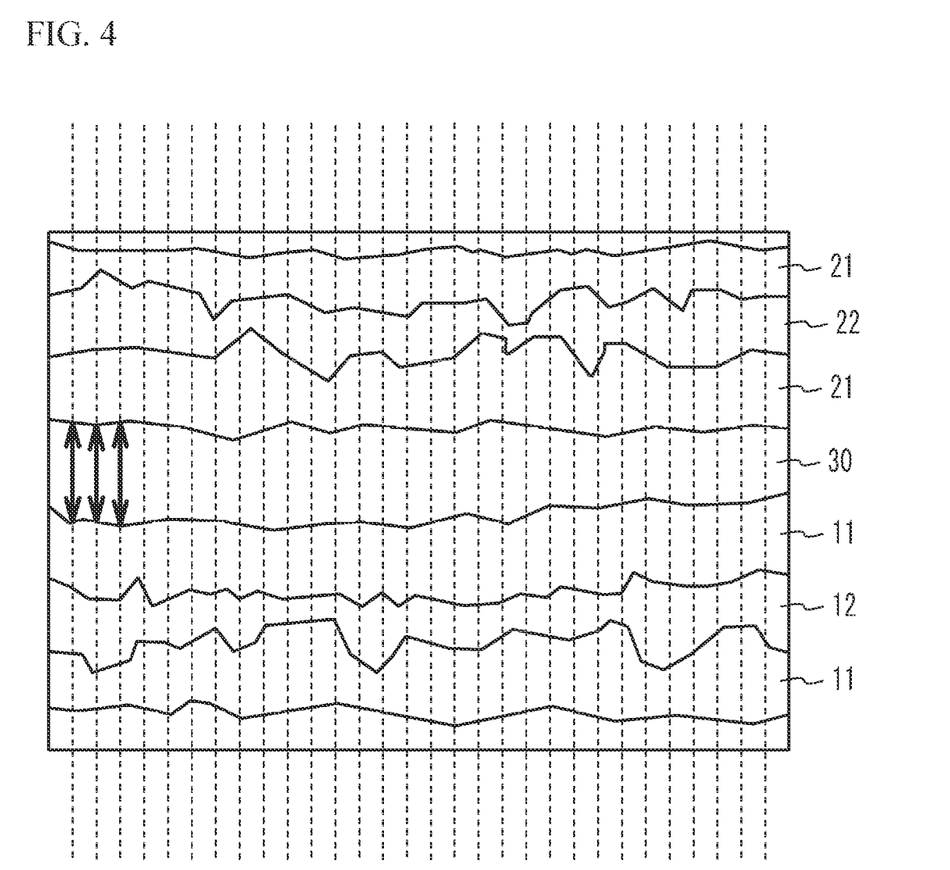
FIG. 4 illustrates a measuring method of interface roughness.

A description will be given of a measuring method of the roughness value of the interfaces. Across section of the all solid battery 100 is observed by a SEM (Scanning Electron Microscope). 10 numbers of SEM images are taken at a position in which a length of the solid electrolyte layer 30 is 7 times to 9 times as the thickness of the solid electrolyte layer 30. And, as illustrated in FIG. 4, in a single image, 30 bar lines having an equal interval are drawn. The bar lines are parallel with a stacking direction. Along the bar lines, the thicknesses of the solid electrolyte layer 30 are measured. 30 thicknesses are measured in a single image. Therefore, totally, 300 thicknesses are measured. From the results, an average value and a standard deviation are calculated. Thus, a coefficient variation: CV value=standard deviation/average value (%) is calculated. The coefficient variation is used as the interface roughness value between the solid electrolyte layer 30, and the first internal electrode layer 11 and the second internal electrode layer 21 sandwiching the solid electrolyte layer 30.

Similarly, 10 numbers of SEM images are taken at a position in which a length of the first electric collector layer 12 is 7 times to 9 times as the thickness of the first electric collector layer 12. As illustrated in FIG. 4, in a single image, 30 bar lines having an equal interval are drawn. Along the bar lines, the thicknesses of the first electric collector layer 12 are measured. 30 thicknesses are measured in a single image. Therefore, totally, 300 thicknesses are measured. From the results, an average value and a standard deviation are calculated. Thus, a coefficient variation: CV value=standard deviation/average value (%) is calculated. The coefficient variation is used as the interface roughness value between the first electric collector layer 12 and the two first internal electrode layers 11 sandwiching the first electric collector layer 12.

Similarly, 10 numbers of SEM images are taken at a position in which a length of the second electric collector layer 22 is 7 times to 9 times as the thickness of the second electric collector layer 22. As illustrated in FIG. 4, in a single image, 30 bar lines having an equal interval are drawn. Along the bar lines, the thicknesses of the second electric collector layer 22 are measured. 30 thicknesses are measured in a single image. Therefore, totally, 300 thicknesses are measured. From the results, an average value and a standard deviation are calculated. Thus, a coefficient variation: CV value=standard deviation/average value (%) is calculated. The coefficient variation is used as the interface roughness value between the second electric collector layer 22 and the two second internal electrode layers 21 sandwiching the second electric collector layer 22.

When the roughness value (first CV value) of interfaces between the solid electrolyte layer 30, and the first internal electrode layer 11 and the second internal electrode layer 21 sandwiching the solid electrolyte layer 30 is excessively large, the solid electrolyte layer 30 may not be necessarily flattened sufficiently. And so, it is preferable that the first CV value has an upper limit. For example, it is preferable that the first CV value is 40% or less. It is more preferable that the first CV value is 35% or less. It is still more preferable that the first CV value is 30% or less.

When the roughness value (second CV value) of the interfaces between the first electric collector layer 12 and the two first internal electrode layers 11 sandwiching the first electric collector layer 12 and the roughness value (second CV value) of the interfaces between the second electric collector layer 22 and the two second internal electrode layers 21 sandwiching the second electric collector layer 22 are excessively small, the peeling may not be necessarily suppressed sufficiently. And so, it is preferable that the second CV value has a lower limit. For example, it is preferable that the second CV value is 20% or more. It is more preferable that the second CV value is 22% or more. It is still more preferable that the second CV value is 30% or more.

On the other hand, when the second CV value is excessively large, the electrical resistance may be large. And so, it is preferable that the second CV value has an upper limit. For example, it is preferable that the second CV value is 50% or less. It is more preferable that the second CV value is 45% or less. It is still more preferable that the second CV value is 40% or less.

In the embodiment, both of the roughness of the interfaces between the first electric collector layer 12 and the two first internal electrode layers 11 sandwiching the first electric collector layer 12 and the roughness of the interfaces between the second electric collector layer 22 and the two second internal electrode layers 21 sandwiching the second electric collector layer 22 are larger than the roughness of the interfaces between the solid electrolyte layer 30, and the first internal electrode layer 11 and the second internal electrode layer 21 sandwiching the solid electrolyte layer 30. However, the structure is not limited. At least one of the roughness may be larger than the roughness of the interfaces between the solid electrolyte layer 30, and the first internal electrode layer 11 and the second internal electrode layer 21 sandwiching the solid electrolyte layer 30.

The thickness of the first internal electrode layer 11 and the second internal electrode layer 21 is, for example, 10 μm or less, 9 μm or less, or 8 μm or less. The thickness of the first electric collector layer 12 and the second electric collector layer 22 is, for example, 10 μm or less, 9 μm or less, or 8 μm or less.

Figure 5:
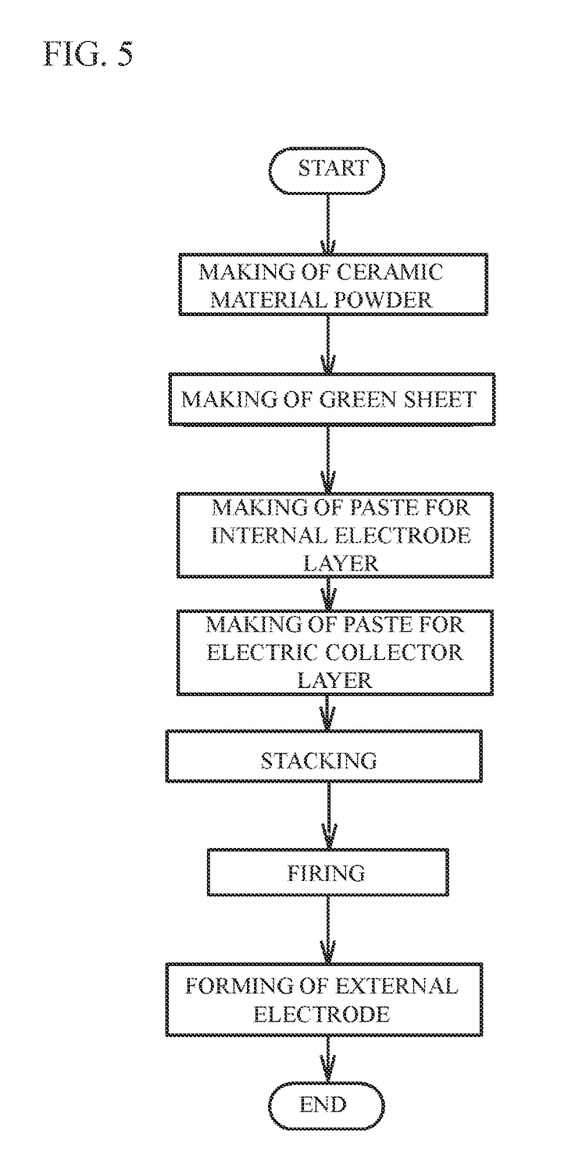
FIG. 5 illustrates a flowchart of a manufacturing method of an all solid battery.

A description will be given of a manufacturing method of the all solid battery 100a. FIG. 5 illustrates a flowchart of the manufacturing method of the all solid battery 100a.

(Making process of ceramic material powder) Powder of oxide-based solid electrolyte for the solid electrolyte layer 30 is made. For example, it is possible to make the solid electrolyte powder, by mixing raw material and additives and using solid phase synthesis method or the like. The resulting powder is subjected to dry grinding. Thus, a grain diameter of the resulting power is adjusted to a desired one. For example, it is possible to adjust the grain diameter to the desired diameter with use of planetary ball mill using $ZrO_2$ ball of 5 mm $\phi$.

The additive includes sintering assistant. The sintering assistant includes one or more of glass components such as Li—B—O-based compound, Li—Si—O-based compound, Li—C—O-based compound, Li—S—O-based compound and Li—P—O-based compound.

(Making process of green sheet) The resulting powder is evenly dispersed into aqueous solvent or organic solvent together with a binding agent, a dispersing agent, a plasticizer and so on. The resulting powder is subjected wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

(Making process of paste for internal electrode) Next, paste for internal electrode is made in order to make the first internal electrode layer 11 and the second internal electrode layer 21. For example, a conductive auxiliary agent, an active material, a solid electrolyte material, a binder, a plasticizer and so on are evenly dispersed into water or organic solvent. Thus, paste for internal electrode layer is obtained. The above-mentioned solid electrolyte paste may be used as the solid electrolyte material. Pd, Ni, Cu, Fe, or alloy thereof, or a carbon material may be used as the conductive auxiliary agent. When the composition of the first internal electrode layer 11 is different from that of the second internal electrode layer 21, paste for internal electrode used for the first internal electrode layer 11 and another paste for internal electrode used for the second internal electrode layer 21 may be individually made.

(Making process of paste for electric collector) Next, paste for electric collector is made in order to make the first electric collector layer 12 and the second electric collector layer 22. It is possible to make the paste for electric collector, by evenly dispersing Pd powder, carbon black, board-shaped graphite carbon, a binder, dispersant, plasticizer and so on into water or organic solvent. In this case, each material is dispersed so that the particles size of the particle components is not less than 1 μm. And, the particle size of the particle components is adjusted so that the relationship (the average particle diameter of the paste for electric collector)>(the average particle diameter of the paste for electrode layer)>(the average particle diameter of the solid electrolyte green sheet) is satisfied.

Figure 6:
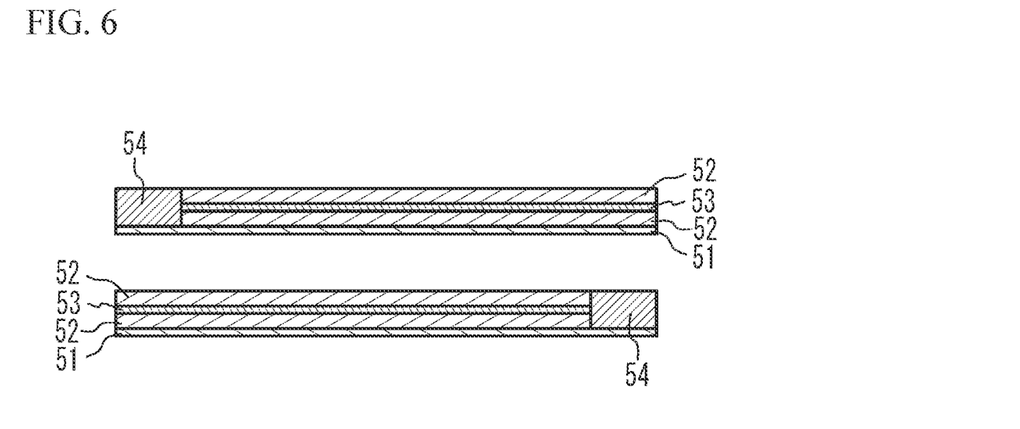
FIG. 6 illustrates a stacking process.

(Stacking process) Paste 52 for internal electrode is printed on one face of a green sheet 51 as illustrated in FIG. 6. Paste 53 for electric collector is printed on the paste 52 for electrode layer. And, another paste 52 for internal electrode is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, the multilayer structure is formed so that each of the combinations of the paste 52 for internal electrode and the paste 53 for electric collector is alternately exposed to each of two end faces, in the multilayer structure.

(Firing process) Next, the multilayer structure is fired. In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the multilayer chip 60 is formed.

(Forming of external electrode) After that, metal paste is applied to the two end faces of the multilayer chip 60. And, the metal paste is fired. Thus, the first external electrode 40a and the second external electrode 40b are formed. Alternatively, the multilayer chip 60 may be put in a dedicated tool so that the first external electrode 40a is spaced from the second external electrode 40b on the upper face, the lower face and the two side faces connected to the two end faces. And, electrodes may be formed by a sputtering. The first external electrode 40a and the second external electrode 40b may be formed by plating on the formed electrodes.

EXAMPLES

The all solid batteries in accordance with the embodiment were made and the property was measured.

(Example 1) $Co_3O_4$, $Li_2CO_3$, dihydrogen phosphate ammonium, $Al_2O_3$, $GeO_2$ were mixed and were used as solid electrolyte material powder. From the solid electrolyte material powder, $Li_{1.3}Al_{0.3}Ge_{1.7}(PO_4)_3$ including a predetermined amount of Co was made by a solid phase synthesizing. The resulting powder was crushed by $ZrO_2$ balls. Moreover, the resulting powder was wet-crushed (dispersion medium: ion exchanged water or ethanol). Thus, solid electrolyte slurry was made. Solid electrolyte paste was obtained by adding a binder to the resulting slurry. And, solid electrolyte green sheet was made. $Li_{1.3}Al_{0.3}Ti_{1.7}(PO_4)_3$ including a predetermined amount of $LiCoPO_4$ and Co was synthesized by a solid phase synthesizing as well as the above-mentioned oxide.

An electrode active material and a solid electrolyte material were highly dispersed with use of wet bead mil. Thus, ceramic paste including only ceramic particles was made. Next, the ceramic paste was mixed with a conducive material. Thus, paste for internal electrode layer was made.

Paste for internal electrode was printed on the solid electrolyte green sheet, with use of a screen having a predetermined pattern. And, paste for electric collector was printed on the paste for internal electrode. And, paste for internal electrode was printed on the paste for electric collector. 10 numbers of the green sheets after the printing were stacked so that each of the electrodes is alternately shifted to right and left. Cover sheets in which solid electrolyte green sheets were stacked were adhered to an upper face and a lower face of the multilayer structure of the stacked green sheets after the printing. The cover sheets were crimped to the multilayer structure by a heating pressurizing press. The resulting multilayer structure was stamped into a predetermined size by a dicer. The binder was removed from the chip after cutting by a thermal treatment in a temperature range of 300 degrees C. to 500 degrees C. After that, the chip was sintered by a thermal treatment of 900 degrees C. or less. Thus, a sintered structure was made.

Each cross section of each sample was observed by a SEM. 10 numbers of SEM images were taken at a position in which a length of the solid electrolyte layer 30 was 7 times to 9 times as the thickness of the solid electrolyte layer 30. In a single image, 30 bar lines having an equal interval were drawn. Along the bar lines, the thicknesses of the solid electrolyte layer 30 were measured. 30 thicknesses were measured in a single image. Therefore, totally, 300 thicknesses were measured. From the results, the average value and the standard deviation were calculated. Thus, the coefficient variation: CV value=standard deviation/average value (%) was calculated. The coefficient variation (the first CV value) was used as the interface roughness value between the solid electrolyte layer 30, and the first internal electrode layer 11 and the second internal electrode layer 21 sandwiching the solid electrolyte layer 30.

Similarly, 10 numbers of SEM images were taken at a position in which a length of the first electric collector layer 12 was 7 times to 9 times as the thickness of the first electric collector layer 12. In a single image, 30 bar lines having an equal interval were drawn. Along the bar lines, the thicknesses of the first electric collector layer 12 were measured. 30 thicknesses were measured in a single image. Therefore, totally, 300 thicknesses were measured. From the results, the average value and the standard deviation were calculated. Thus, the coefficient variation: CV value=standard deviation/average value (%) was calculated. The coefficient variation (the second CV value) was used as the interface roughness value between the first electric collector layer 12, and two first internal electrode layers 11 sandwiching the first electric collector layer 12.

Similarly, 10 numbers of SEM images were taken at a position in which a length of the second electric collector layer 22 was 7 times to 9 times as the thickness of the second electric collector layer 22. In a single image, 30 bar lines having an equal interval were drawn. Along the bar lines, the thicknesses of the second electric collector layer 22 were measured. 30 thicknesses were measured in a single image. Therefore, totally, 300 thicknesses were measured. From the results, the average value and the standard deviation were calculated. Thus, the coefficient variation: CV value= standard deviation/average value (%) was calculated. The coefficient variation (the second CV value) was used as the interface roughness value between the second electric collector layer 22, and two second internal electrode layers 21 sandwiching the second electric collector layer 22.

The average thickness of the solid electrolyte layer 30 was 8 µm. The first CV value was 30%. The second CV value was 34%.

(Example 2) In an example 2, the average thickness of the solid electrolyte layer 30 was 7 µm. The first CV value was 30%. The second CV value was 34%. Other conditions were the same as those of the example 1.

(Example 3) In an example 3, the average thickness of the solid electrolyte layer 30 was 6 µm. The first CV value was 30%. The second CV value was 34%. Other conditions were the same as those of the example 1.

(Example 4) In an example 4, the average thickness of the solid electrolyte layer 30 was 7 µm. The first CV value was 30%. The second CV value was 50%. Other conditions were the same as those of the example 1.

(Example 5) In an example 5, the average thickness of the solid electrolyte layer 30 was 7 µm. The first CV value was 40%. The second CV value was 50%. Other conditions were the same as those of the example 1.

(Example 6) In an example 6, the average thickness of the solid electrolyte layer 30 was 5 µm. The first CV value was 18%. The second CV value was 22%. Other conditions were the same as those of the example 1.

(Comparative example) In a comparative example, the average thickness of the solid electrolyte layer 30 was 7 µm. The first CV value was 35%. The second CV value was 34%. Other conditions were the same as those of the example 1.

(Short occurrence rate) With respect to each sample of the examples 1 to 6 and the comparative example, it was confirmed whether short occurred or not. When the conductivity was $10^{-3}$ S/cm or more, it was determined that the short occurred. The number of samples of each of the examples 1 to 6 and the comparative example was 100. The ratio of samples in which the short occurred was calculated as the short occurrence rate. When the short occurrence rate was 5% or less, the short occurrence rate was determined as very good "⊚". When the short occurrence rate was more than 5% and 10% or less, the short occurrence rate was determined as good "○". When the short occurrence rate was more than 10% and less than 15%, the short occurrence rate was determined as so-so "Δ". When the short occurrence rate was 15% or more, the short occurrence rate was determined as bad "x".

(Cycle characteristic) With respect to each sample of the examples 1 to 6 and the comparative example, discharge and charge at 10 C were repeated at 25 degrees C., within a voltage range of 2.5 V to 0 V. The ratio of the 200-th discharge capacity with respect to the initial discharged capacity was used as the cycle characteristic. When the cycle characteristic was more than 90%, the cycle characteristic was determined as very good "⊚". When the cycle characteristic was 85% or more and 90% or less, the cycle characteristic was determined as good "○". When the cycle characteristic was 80% or more and 85% or less, the cycle characteristic was determined as so-so "Δ". When the cycle characteristic was less than 80%, the cycle characteristic was determined as bad "x".

(Self-discharge characteristic) With respect each sample of the examples 1 to 6 and the comparative example, a voltage was monitored under an open circuit, at 25 degrees C. after full charge. The ratio of the voltage after 50 hours with respect to the voltage just after starting of the measuring was calculated. The ratio was used as the self-discharge characteristic. When the self-discharge characteristic was 95% or less, the self-discharge characteristic was determined as very good "⊚". When the self-discharge characteristic was 90% or more and less than 95%, the self-discharge characteristic was determined as good "○". When the self-discharge characteristic was 80% or more and less than 90%, the self-discharge characteristic was determined as so-so "Δ". When the self-discharge characteristic was less than 80%, the self-discharge characteristic was determined as bad "x".

Table 1 shows the results of the examples 1 to 6 and the comparative example.

TABLE 1

| | THICKNESS OF ELECTROLYTE (μm) | 1ST CV (%) | 2ND CV (%) | SHORT (%) | CYCLE (%) | SELF-DISCHARGE (%) | DETERMINATION | TOTAL DETERMINATION |
|---|---|---|---|---|---|---|---|---|
| EXAMPLE 1 | 8 | 30 | 34 | 3 | 92 | 96 | ◎—◎—◎ | ○ |
| EXAMPLE 2 | 7 | 30 | 34 | 5 | 91 | 95 | ◎—◎—◎ | ○ |
| EXAMPLE 3 | 6 | 30 | 34 | 9 | 87 | 90 | ○—○—○ | ○ |
| EXAMPLE 4 | 7 | 30 | 50 | 7 | 90 | 92 | ○—◎—○ | ○ |
| EXAMPLE 5 | 7 | 40 | 50 | 13 | 82 | 83 | Δ  Δ—Δ | ○ |
| EXAMPLE 6 | 5 | 18 | 22 | 11 | 85 | 88 | Δ—○—Δ | ○ |
| COMPARATIVE EXAMPLE | 7 | 35 | 34 | 15 | 79 | 80 | X  X—Δ | X |

In the example 1, the short occurrence rate was 3%. Therefore, the short occurrence rate was determined as very good. The cycle characteristic was 92%. Therefore, the cycle characteristic was determined as very good. The self-discharge characteristic was 96%. Therefore, the self-discharge characteristic was determined as very good.

In the example 2, the short occurrence rate was 5%. Therefore, the short occurrence rate was determined as very good. The cycle characteristic was 91%. Therefore, the cycle characteristic was determined as very good. The self-discharge characteristic was 95%. Therefore, the self-discharge characteristic was determined as very good.

In the example 3, the short occurrence rate was 9%. Therefore, the short occurrence rate was determined as good. The cycle characteristic was 87%. Therefore, the cycle characteristic was determined as good. The self-discharge characteristic was 90%. Therefore, the self-discharge characteristic was determined as good.

In the example 4, the short occurrence rate was 7%. Therefore, the short occurrence rate was determined as good. The cycle characteristic was 90%. Therefore, the cycle characteristic was determined as good. The self-discharge characteristic was 92%. Therefore, the self-discharge characteristic was determined as good.

In the example 5, the short occurrence rate was 13%. Therefore, the short occurrence rate was determined as so-so. The cycle characteristic was 82%. Therefore, the cycle characteristic was determined as so-so. The self-discharge characteristic was 83%. Therefore, the self-discharge characteristic was determined as so-so.

In the example 6, the short occurrence rate was 11%. Therefore, the short occurrence rate was determined as so-so. The cycle characteristic was 85%. Therefore, the cycle characteristic was determined as so-so. The self-discharge characteristic was 88%. Therefore, the self-discharge characteristic was determined as so-so.

In the comparative example, the short occurrence rate was 15%. Therefore, the short occurrence rate was determined as bad. The cycle characteristic was 79%. Therefore, the cycle characteristic was determined as bad. The self-discharge characteristic was 80%. Therefore, the self-discharge characteristic was determined as so-so.

When there is no determination as bad in the short occurrence rate, the cycle characteristic and the self-discharge characteristic, the sample was determined as totally good "○". When at least one of the short occurrence rate, the cycle characteristic and the self-discharge characteristic of a sample were determined as bad, the sample was determined as totally bad "x".

The examples 1 to 6 were determined as totally good "○". It is thought that this was because the relationship of the first CV value<the second CV value was satisfied, and the solid electrolyte layer 30 was sufficiently flattened. On the other hand, the comparative example was determined as totally bad "x". It is thought that this was because the relationship of the first CV value≥the second CV value was satisfied, the solid electrolyte layer 30 was not sufficiently flattened.

(Peeling) With respect to each sample of the examples 1 to 6 and the comparative example, it was confirmed whether peeling occurred or not. In the examples 1 to 6, the peeling was not confirmed. It is thought that this was because the relationship of the first CV value<the second CV value, the anchor effect was obtained, and the adhesion between the electric collector layer and the two electrode layers sandwiching the electric collector layer was improved. On the other hand, in the comparative example, peeling occurred in at least one of samples. It is thought that this was because the relationship of the first CV value>the second CV value was satisfied, and the adhesion between the electric collector layer and the two electrode layers sandwiching the electric collector layer was not sufficiently achieved.

Although the embodiments of the present invention have been described in detail, it is to be understood that the various change, substitutions, and alterations could be made hereto without departing from the spirit and scope of the invention.

What is claimed is:

1. An all solid battery comprising:
a solid electrolyte layer of which a main component is oxide-based solid electrolyte;
a first electrode structure that is provided on a first main face of the solid electrolyte layer and has a structure in which a first electric collector layer of which a main component is a conductive material is sandwiched by two first electrode layers including an active material; and
a second electrode structure that is provided on a second main face of the solid electrolyte layer and has a structure in which a second electric collector layer of which a main component is a conductive material is sandwiched by two second electrode layers including an active material,
wherein roughness of interfaces between the first electric collector layer and the two first electrode layers is larger than roughness of interfaces between the solid electrolyte layer and the first electrode layer and the second electrode layer sandwiching the solid electrolyte layer, roughness of interfaces between the second electric collector layer and the two second electrode layers is larger than the roughness of the interfaces between the solid electrolyte layer, and the first electrode layer and the second electrode layer sandwiching the solid electrolyte layer, or both of the roughness of the interfaces between the first electric collector layer and the two first electrode layers and the roughness of the interfaces between the second electric collector layer and the two second electrode layers are larger than the roughness of the interfaces between the solid electrolyte layer, and the first electrode layer and the second electrode layer sandwiching the solid electrolyte layer.

2. The all solid battery as claimed in claim 1, wherein a thickness of the solid electrolyte layer is 8 µm or less.

3. The all solid battery as claimed in claim 1, wherein a roughness value of the interfaces between the first electric collector layer and the two first electrode layers is 20% or more, a roughness value of the interfaces between the second electric collector layer and the two second electrode layers is 20% or more, or both of the roughness value of the interfaces between the first electric collector layer and the two first electrode layers and the roughness value of the interfaces between the second electric collector layer and the two second electrode layers are 20% or more, when a coefficient variation of a plurality of thicknesses at different locations is used as the roughness value, wherein a roughness value of the interfaces between the solid electrolyte layer, and the first electrode layer and the second electrode layer sandwiching solid electrolyte layer is 40% or less.

4. The all solid battery as claimed in claim 1, wherein a roughness value of the interfaces between the first electric collector layer and the two first electrode layers is 50% or less, a roughness value of the interfaces between the second electric collector layer and the two second electrode layers is 50% or less, or both of the roughness value of the interfaces between the first electric collector layer and the two first electrode layers and the roughness value of the interfaces between the second electric collector layer and the two second electrode layers are 50% or less, when a coefficient variation of a plurality of thicknesses at different locations is used as the roughness value.

5. A manufacturing method of an all solid battery comprising:

preparing a multilayer structure having a solid electrolyte green sheet including oxide-based solid electrolyte particles, a first structure that is provided on a first main face of the solid electrolyte green sheet and has a structure in which a first electric collector paste pattern including a conductive material is sandwiched by two first electrode paste patterns including an active material, and a second structure that is provided on a second main face of the solid electrolyte green sheet and has a structure in which a second electric collector paste pattern including a conductive material is sandwiched by two second electrode paste patterns including an active material; and firing the multilayer structure, wherein a particle diameter of the first electric collector paste pattern, a particle diameter of the second electric collector paste pattern, or both of the particle diameter of the first electric collector paste pattern and the particle diameter of the second electric collector paste pattern are adjusted, so that roughness of interfaces between a first electric collector layer formed from the first electric collector paste pattern and two first electrode layers formed from the two first electrode paste patterns is larger than roughness of interfaces between a solid electrolyte layer formed from the solid electrolyte green sheet, and the first electrode layer and the second electrode layer sandwiching the solid electrolyte layer, roughness of interfaces between a second electric collector layer formed from the second electric collector paste pattern and two second electrode layers formed from the two second electrode paste patterns is larger than the roughness of the interfaces between the solid electrolyte layer, and the first electrode layer and the second electrode layer sandwiching the solid electrolyte layer, or both of the roughness of the interfaces between the first electric collector layer and the two first electrode layers and the roughness of the interfaces between the second electric collector layer and the two second electrode layers is larger than roughness of the interfaces between the solid electrolyte layer, and the first electrode layer and the second electrode layer sandwiching the solid electrolyte layer.

* * * * *